United States Patent [19]
Hughes et al.

[11] 3,905,009
[45] Sept. 9, 1975

[54] TRANSDUCER ARRAY SCANNING SYSTEM

[75] Inventors: William J. Hughes; William Thompson, Jr., both of State College; Richard D. Ingram, Boalsburg, all of Pa.

[73] Assignee: The United States of America as represented by the Secretary of the Navy, Washington, D.C.

[22] Filed: Sept. 20, 1974

[21] Appl. No.: 507,843

[52] U.S. Cl. .......................... 340/6 R; 343/100 SA
[51] Int. Cl.² .......................................... G01S 3/80
[58] Field of Search...... 340/6 R, 16 R; 343/100 SA

[56] References Cited
UNITED STATES PATENTS

| | | | |
|---|---|---|---|
| 3,670,335 | 6/1972 | Hirsch............................ | 340/6 R X |
| 3,701,156 | 10/1972 | Killion .......................... | 343/100 SA |

*Primary Examiner*—Richard A. Farley
*Attorney, Agent, or Firm*—R. S. Sciascia; Henry Hansen; William J. Iseman

[57] ABSTRACT

A scanning system for use in a torpedo homing device having a planar transducer array that produces steerable sum or difference beam patterns of desired shape which are continuously scanned across the aperture of the array by a single control signal indicative of a predetermined beam direction. Outputs from individual transducer elements within the array are amplitude shaded by respective amplifiers to incorporate beam direction control. A first summing network adds amplitude shaded signals indicative of a phase symmetric beam pattern and a second summing network adds amplitude shaded signals indicative of a phase antisymmetric beam pattern. Phase shifters are connected to receive output signals from each of the respective summing networks to remove the quadrature phase difference between the summed output signals. A third summing network adds the outputs from each of the phase shifters to form a beam pattern steered in the predetermined direction.

11 Claims, 5 Drawing Figures

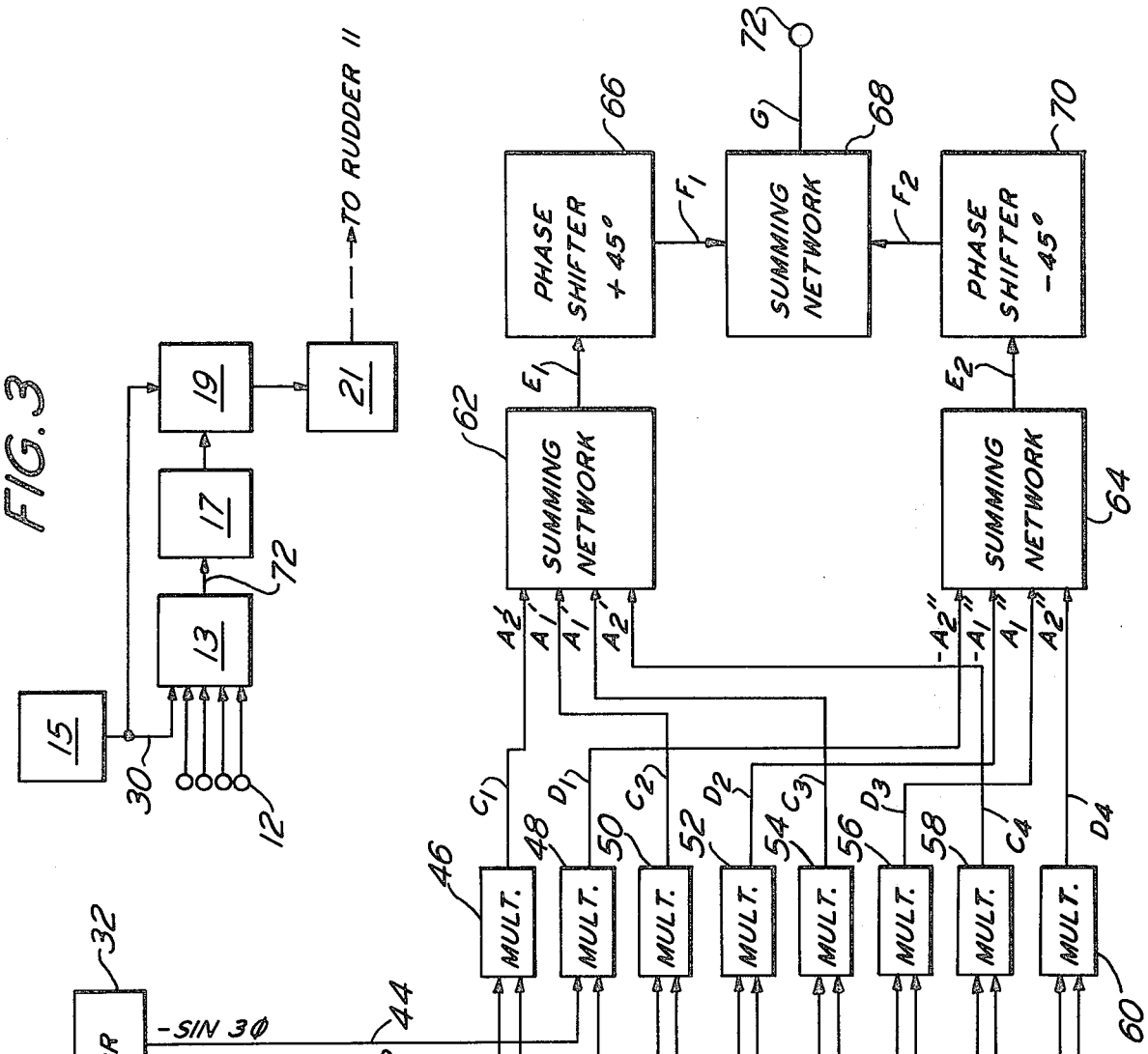

TRANSDUCER ARRAY SCANNING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to torpedo homing devices which electronically process transducer array signals in receiving and transmitting acoustical or electromagnetic information and more particularly to a scanning system in which the transducer signals are amplitude shaded or weighted for forming directional beam patterns which are continuously scannable across the aperture of the array.

Heretofore, directional patterns having their peak response at beam angles other than normal to the plane of the array generally have been formed using numerous time delay lines or phase shifting devices. Consequently, the beam direction to which the maximum response can be steered is fixed and cannot be varied because the values of the time delays or phase shift are either fixed or not easily controllable. In order to obtain scanning of a directional pattern, transducer arrays have been designed with contours other than planar and which, accordingly, require a multitude of mechanical servo controls.

SUMMARY OF THE INVENTION

Accordingly, it is an object of the present invention to provide a scanning system for planar transducer arrays which continuously scans directional beam patterns across the field of view of the array. Another object of the invention is to provide for directional control of the transducer beam pattern by use of a single control signal which amplitude shades or weights the output signals from the array.

Briefly, these and other objects are accomplished by a scanning system which amplitude shades the individual output signals from an equally spaced planar array of transducer elements. When used as a receiver, output signal amplitudes of each element of the array are amplified by a predetermined gain factor to produce a directional beam pattern that is normal to the plane of the array. The predetermined gain factors are chosen according to desired system operating parameters such as for example, relative power levels between the main and side lobes of a selected directional beam pattern. The amplitude weighted signals are separated into two channels, respective ones of which are representative of phase symmetric and phase antisymmetric directional patterns. A single control signal indicative of a preselected directional pattern angle generates control signals for a plurality of amplifiers which individually amplitude weight respective ones of the phase symmetric and phase antisymmetric signals. Dual summing networks respectively add amplitude weighted signals representative of phase symmetric patterns and amplitude weighted signals representative of phase antisymmetric patterns. Dual phase shifters respectively connected to receive output signals from the summing networks remove the phase quadrature relationship between the signals. A final summing network is connected to receive respective outputs from the phase shifters to produce an in-phase pattern output steered to the desired beam pattern angle.

For a better understanding of these and other aspects of the invention, reference may be made to the following description taken in conjunction with the accompanying drawings.

BRIEF DESCRIPTION OF THE DRAWINGS

FIG. 3 is a block diagram of a homing system which incorporates the present invention and which may be used with the torpedo shown in FIG. 1;

FIG. 4 is a block diagram of the present invention used in conjunction with the four element array shown in FIG. 1.

DESCRIPTION OF THE PREFERRED EMBODIMENT

For purposes of clearer understanding and simple illustration, the preferred embodiment will illustrate a scanning system that is used with a four element line transducer array. This embodiment is by example only as it will become clear to those skilled in the art that the present invention may be adapted to a line array or a planar array having an even or odd number of elements.

Figure 1:
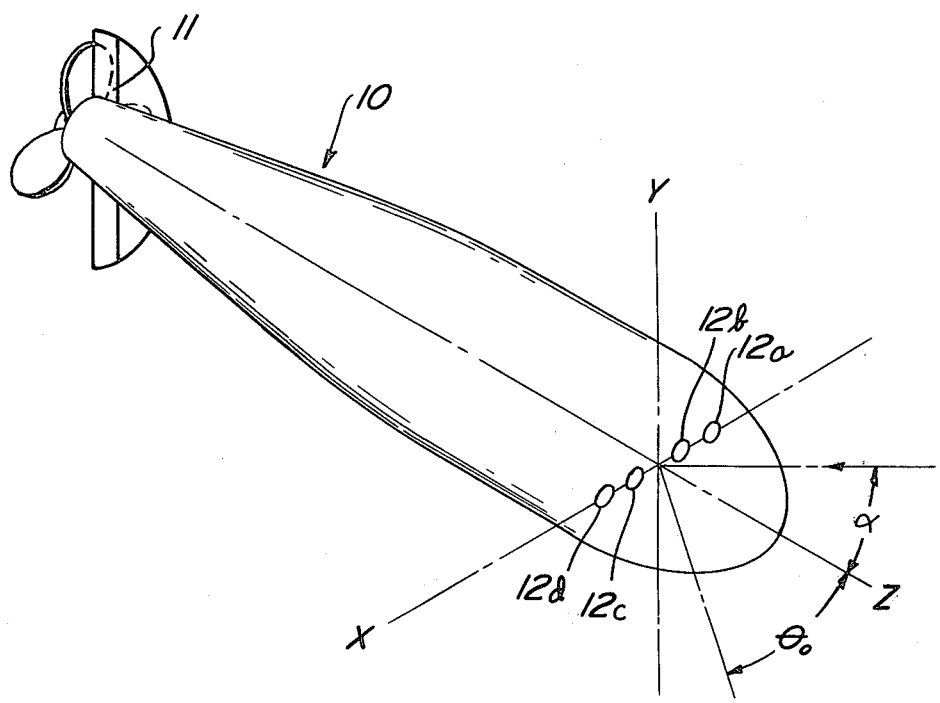
FIG. 1 is a drawing of a torpedo which houses a line array of transducer elements which may be used within the present invention.

Referring now to FIG. 1, there is illustrated a torpedo 10 containing an even numbered line array of four transducer elements 12a, 12b, 12c, 12d spaced equally on an axis X. The line array may be mounted to the rear of the nose of the torpedo 10 which can be formed, for example, from an acoustically transparent material such as rubber. A vertical rudder 11 is positioned toward the tail of the torpedo 10 and serves to steer the torpedo in a horizontal direction. Obviously, containers other than the illustrated torpedo 10 may be used with a corresponding material that will allow passage of the energy sought to be transmitted or received. The frequency range of the impinging or transmitted energy may be in the sonic or ultrasonic regions and is dictated by the operating parameters of the transducer elements. The direction of peak response for the array is defined as a tilt angle $\theta_o$ measured from a longitudinal axis Z which is normal to and bisects the array. The angle $\theta_o$ may be either positive or negative depending upon which side of the Z axis it falls. A simple sign convention is to make all angles going clockwise from the Z axis positive and those going counterclockwise negative, as viewed looking forward from the line of the array. Accordingly, the angle $\theta_o$ in FIG. 1 is positive. A negative angle $\alpha$ is shown depicting a propagation vector drawn to the center of the line array from some arbitrary source of sonic energy (not shown) external to the torpedo 10.

Figure 2:
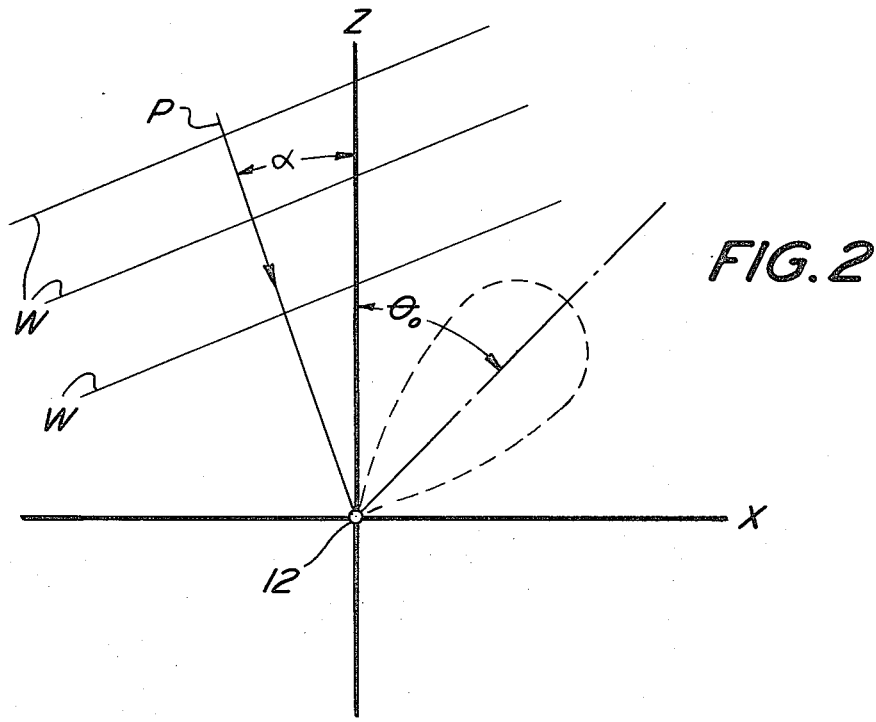
FIG. 2 is a drawing of a beam pattern lobe and impinging energy wavefront in cartesian coordinates as related to the array shown in FIG. 1.

Referring now to FIG. 2 there is shown a drawing of a typical main beam pattern lobe such as may be generated by the transducer elements $12a–12d$ of FIG. 1. The transducer elements 12 may be considered as point receivers or transmitters which generate a beam pattern inclined at the angle $\theta_o$ measured from the normal axis Z. A wavefront W of acoustic or electromagnet energy generated at some distant point (not shown) is directed toward the elements 12 along a propagation vector P located at an angle $\alpha$ from the Z axis. Corresponding to the embodiment shown in FIG. 1, the angle $\theta_o$ would preferably scan a region of $\pm 90°$ from the normal axis Z assuming that the energy wavefront W would always be forward of the torpedo 10. Of course, the angle $\theta_o$ could be made to traverse any predetermined sector about the axis Z with the use of omnidirectional transducers. For purposes of explanation, each of the elements 12 is assumed to be in the receive type mode and acts as part of a homing system within the torpedo 10.

The directional pattern of a transducer array steered to a particular angle measured from the normal of that array may be adequately described in a mathematical expression designated as a pattern function $P(\theta)$. A discussion of pattern functions as well as other associated operating parameters attributable to steerable transducer arrays is noted with further detail in "Underwater Acoustic Handbook - II" by Vernon M. Albers, Pennsylvania State University Press, 1965. The pattern function $P(\theta)$ of an even numbered array of 2N elements such as that illustrated in FIG. 1 with its peak response steered to an angle of $\theta_o$ is:

$$P(\theta) = A_1 \cos(u - \phi) + A_2 \cos[3(u - \phi)] + ... + A_N \cos[(2N-1)(u - \phi)],$$

wherein:

$u = (kd \sin \theta)/2$; $k = \omega/c$;

$\omega$ is the circular frequency of the array designated in radians per second;

c is the sound velocity in the medium; and d is the center to center spacing between transducer elements.

A beam steered to an angle $\theta_o$ will correspond to a control angle $\phi = (kd \sin \theta_o)/2$. Expanding the foregoing pattern function using well known fundamental trigonometric identifies and regrouping the terms will produce:

$$P(\theta) = [A_1' \cos u + A_2' \cos 3u + ... A_N' \cos(2N-1)u]$$
$$+ [A_1'' \sin u + A_2'' \sin 3u + ... A_N'' \sin(2N-1)u]$$

wherein $A_1' = A_1 \cos\phi$, $A_2' = A_2 \cos 3\phi$, etc.; and
$A_1'' = A_1 \sin\phi$, $A_2'' = A_2 \sin 3\phi$, etc.

The first bracketed series of terms in the above expanded expression is the pattern function of an unsteered sum array which is a phase symmetric beam pattern. The second bracketed series in the foregoing expanded pattern function is the pattern function of an unsteered difference array which is a phase antisymmetric pattern. By combining these patterns, i.e., the phase symmetric and phase antisymmetric patterns, as mathematically indicated, a directivity beam steered to an angle $\theta_o$ will be produced. The specific amplitude coefficients A required to produce the two pattern functions and hence the steered beam are dependent upon the value of the control angle $\phi$ which in turn determines the tilt angle $\theta_o$. If $\phi$ remains a fixed value, then the steered beam remains fixed. However, if $\phi$ is controlled and continuously changed, then the steered beam will scan the transducer array aperture as desired. It should be noted, that the output signal corresponding to an unsteered sum pattern (cosine terms) and the output signal corresponding to an unsteered difference pattern (sine terms) are inherently in phase quadrature with one another and, therefore, must be brought into phase, as required in the above expanded mathematical expression, before they are combined to form the tilted beam at the desired angle $\theta_o$.

The foregoing pattern function $P(\theta)$ can be modified to include the case of an odd number of transducer elements as well as a difference directivity pattern or other desired patterns which may satisfy the requirements of the system designed. Moreover, the medium in which the array is considered to operate can be easily changed by merely changing the speed of the energy velocity in that medium.

Referring now to FIG. 3, there is shown a block diagram of a homing system which may be used with the torpedo 10 shown in FIG. 1. The array transducer elements 12 provide outputs to a scanning system 13 such as the present invention. A signal generator 15 provides a continuously varying output 30 which is indicative of the angular sweep direction of the beam pattern. This output, for example, may be a sawtooth waveform varying between predetermined limits. A threshold detector 17 receives the output 72 of the scanning system 13 and examines the output for any signal levels of interest such as a target. If a target should fall within some portion of the constantly sweeping beam pattern, the detector 17 provides an output to activate a sample and hold circuit 19. The circuit 19 samples the instantaneous control signal output 30 produced by the generator 15 and holds the signal level until a new sample is taken. The control signal 30 is then passed from the circuit 19 to the input of a steering servo 21 which provides a mechanical output to steer the rudder 11 in the torpedo to the target. This example of a homing system could also be used to track a target because of the continued updating of the circuit 19 by different values of the control signal.

Referring now to FIG. 4, there is shown a block diagram of the present invention. When used as a receiver such as in the torpedo 10 in FIG. 1, the transducer array outputs provide signal inputs to the scanning system 13. Accordingly, transducer elements 12a, 12b, 12c and 12d provide respective outputs over lines 14, 16, 18, 20 to corresponding amplifiers 22, 24, 26 and 28. Each of the amplifiers 22–28 amplify the incoming signals from the respective transducer elements 12 by a potentially different predetermined gain coefficient A. For example, amplifier 22 amplifies transducer element 12a output by a predetermined gain coefficient $A_2$ and amplifier 24 amplifies the analog output from transducer element 12b by a predetermined gain coefficient $A_1$. The gain coefficient A associated with each of the amplifiers 22–28 corresponds to selected terms of the pattern function $P(\theta)$ for an even numbered line array as earlier noted. A single control input terminal 30 is adapted to receive an input control signal $\phi$. A conventional function generator 32 receives the control input signal $\phi$ from terminal 30 and provides trigonometric functional values of the input signal as dictated by the pattern function $P(\theta)$ of the array being utilized. For the four element linear array shown in the present example, the pattern function corresponding to this array requires the electronic implementation of the following terms: $\sin \phi$, $-\sin \phi$, $\sin 3\phi$, $-\sin 3\phi$, $\cos \phi$, and $\cos 3\phi$. Accordingly, the generator 32 produces these terms on a continuing basis with each term varying in value according to the varying value of the input signal $\phi$. The minimum and maximum values of the input signal $\phi$ may be easily determined from the earlier noted equation $\phi = (kd \sin \theta_o)/2$. In the present example, the four element linear array is assumed to be unidirectional with the peak response being defined as an angle $\theta_o$ measured from a line normal to the center of the array as earlier shown in FIG. 1. The areas of interest, therefore, that are theoretically capable of providing peak responses may range from the normal line to +90° or −90°. Accordingly, the appropriate substitution is made for the values of $\theta_o$ and the foregoing equation thus provides the end limit values for the control input signal $\phi$. Realistically speaking, however, and as well known to those skilled in the art, the effective angular excursion from normal for obtaining a peak response is generally limited to an angle of $\theta_o = \pm 60°$. Obviously, if the transducer elements were omnidirectional in their operating characteristics, the control signal $\phi$ would be representative of even greater peak response angular excursions. The function generator 32, by way of example, may be constructed utilizing a read only memory that offers a table lookup system. The output of amplifier 22 is commonly connected to respective inputs of a first multiplier 46 and a second multiplier 48. Multiplier 46 has a second input connected to receive a control signal representative of cos $3\phi$ over output line 36 from generator 32. Multiplier 48 has a second input connected to receive a control signal representative of −sin $3\phi$ over output line 44 from generator 32. Amplifier 24 provides an output commonly connected to respective first inputs of a third multiplier 50 and a fourth multiplier 52. Multiplier 50 has a second input connected to receive a control signal representative of cos$\phi$ over output line 34 from generator 32. Multiplier 52 has a second input connected to receive a control signal representative of −sin$\phi$ over output line 38 of generator 32. Amplifier 26 provides an output commonly connected to respective first inputs of a fifth multiplier 54 and a sixth multiplier 56. Multiplier 54 has a second input connected to receive the cos $\phi$ control signal over output line 34 from generator 32. Multiplier 56 has a second input connected to receive a control signal representative of sin $\phi$ over output line 40 from generator 32. Amplifier 28 provides an output commonly connected to respective first inputs of a seventh multiplier 58 and an eighth multiplier 60. Multiplier 58 has a second input connected to receive a cos $3\phi$ control signal over output line 36 from generator 32. Multiplier 60 has a second input connected to receive a control signal representative of sin $3\phi$ over output line 42 from generator 32. The outputs of multipliers 46, 50, 54, and 58 are all individually connected to respective inputs of a first summing network 62. Similarly, the outputs of the remaining multipliers 48, 52, 56, and 60 are all connected to respective inputs of a second summing network 64. Both of the summing networks 62 and 64 are conventional in design and may for example comprise summing amplifiers, the structure of which is well known to those skilled in the art. A +45° phase shifter 66 is connected to receive the summed output from network 62 and provides a phase shifted output signal to a first input of a third summing network 68. A −45° phase shifter 70 is connected to receive the summed output signal from network 64 and provides a phase shifted output signal to a second input of the third summing input 68. The output signal of network 68 is connected to an output terminal 72.

Figure 5:
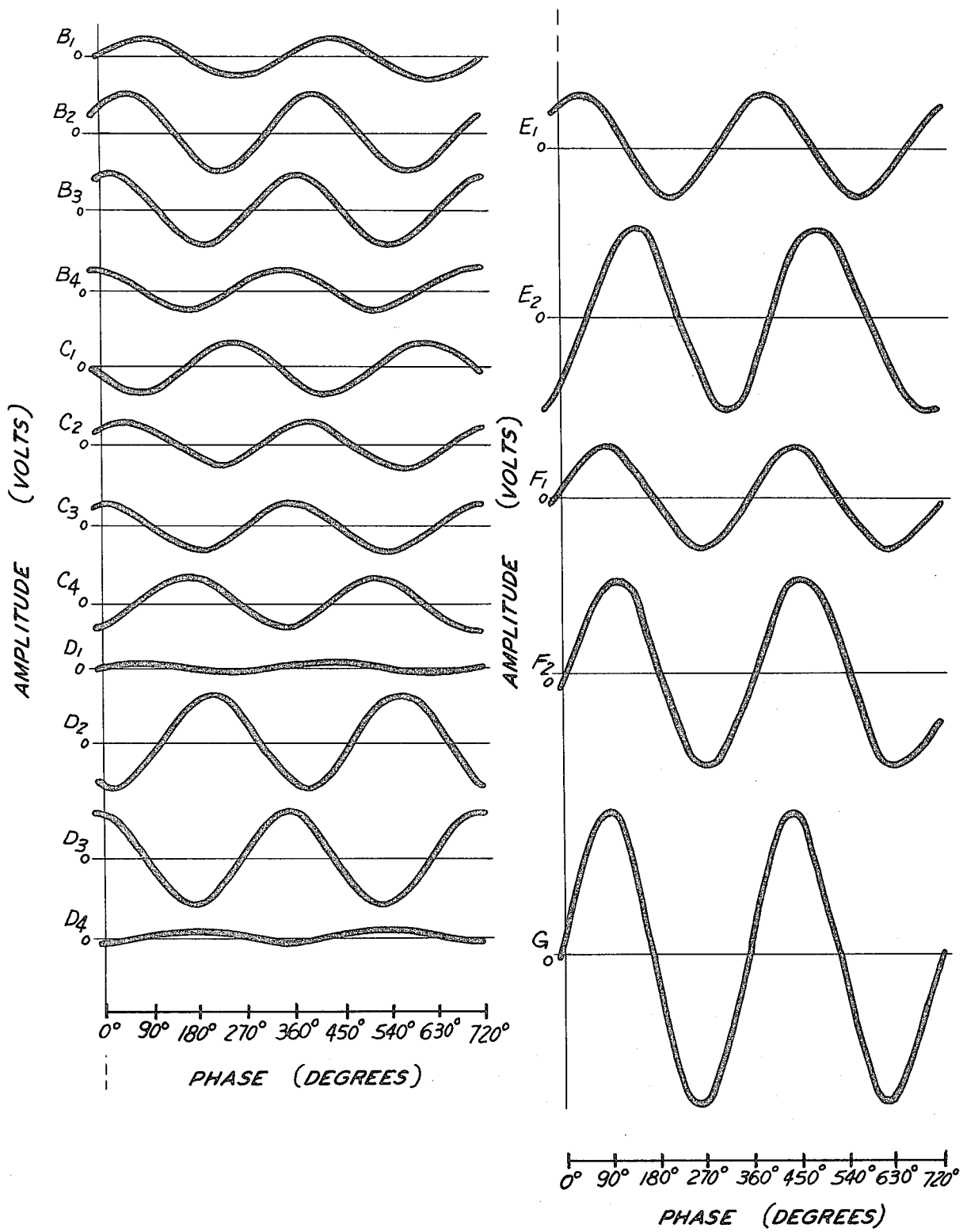
FIG. 5 is an illustration of signal waveforms generated by the operation of the present invention.

The operation of the invention will now be described with reference to FIG. 4 in conjunction with FIG. 5 which illustrates signal waveforms generated by the invention. For purposes of clearly illustrating the operation of the invention and by way of example only, the four element line array shown in FIG. 1 is assumed to receive an acoustic signal of 15 KHz. at a wavefront impingement angle $\alpha$ of approximately 10° from normal. The transducer elements 12a–12d are equally spaced at approximately one-half wavelength and the tilt angle $\theta_o$ is selected to be 45°. At an angle $\alpha = 10°$, the wavefront W will cause the elements 12a–12d to produce sequential output signals which will phase lag one another by approximately 30°. The control signal $\phi$ necessary to produce a steered beam pattern to the angle $\theta_o = 45°$ is calculated according to aforementioned equations to be representative of approximately 63.7°. The side lobes of the steered beam pattern to be generated are predetermined by design choice to be a certain db. level down from the peak of the main lobe of the beam pattern. The gain coefficients $A_1$ and $A_2$ are then computed from the predetermination. Such computations are further detailed, for example, by C. L. Dolph in "Proceedings of the IRE," June 1943. For a beam pattern to be symmetric in both amplitude and phase about the geometric center of an array requires that the weighting factors $A_1$, $A_2$, etc. be symmetrically distributed among the signal amplifiers associated with respective transducer elements. Consequently, the array shown in FIG. 1 is symmetric about a point equidistant between elements 12b and 12c with the result that amplifiers 24, 26 have a gain coefficient $A_1$, for example, of 1.0 and amplifiers 22, 28 have a gain coefficient $A_2$, for example, of 0.5. Amplfiers 24, 26 which are nearer the center of the array, are designed with the higher gain coefficient because in this particular example it is desired to suppress the effects of the beam pattern side lobes. Other gain coefficients may be calculated to either suppress or enhance the effects of side or main lobes as desired.

The output signal from transducer elements 12a is amplified by amplifier 22 which produces an output signal shaded by a 0.5 gain coefficient $A_2$. The amplified output signal shown in waveform $B_1$, is then passed to one input of the first multiplier 46. Similarly, the output signal from element 12b is amplified by amplifier 24 which produces an output signal shaded by a 1.0 gain coefficient $A_1$. The resultant amplified output signal is shown in waveform $B_2$. Note that the amplitudes of signal waveforms $B_1$ and $B_2$ correspond to the gain coefficients $A_1$, $A_2$ and that the waveforms differ in phase by approximately 30°. By example, and assuming that the signal amplitudes from respective transducer elements are all equal to 2.8$V_{p-p}$, the amplitude of waveform $B_1$ is 1.4$V_{p-p}$ at a relative phase angle of 90° and waveform $B_2$ is 2.8$V_{p-p}$ at 60°. Similarly, waveform $B_3$ is 2.8$V_{p-p}$, 30° and waveform $B_4$ is 1.4$V_{p-p}$ 0°. Since element 12d would be the first element to be impinged upon by wavefront W at a positive angle $\alpha$, unlike FIG. 1 and FIG. 2 which illustrate a negative angle $\alpha$, the signal output from corresponding amplifier 28 provides a 0° phase reference.

Multiplier 46 has a second input connected to receive the control signal cos $3\phi$. The cos $3\phi$ signal, and all other control signals are generated by providing an input signal $\phi$ to the generator 32. In this example, the control input $\phi$ is a signal level representative of the angle 63.7°. Accordingly, the output signal on line 34 of generator 32 is a signal level equal to cos 191.10° or −.981. This control signal level acts as a scaling factor or gain coefficient much as in the example of the amplifiers 22–28 having fixed gains $A_1$ and $A_2$. Accordingly, multiplier 46 receives the $1.4V_{p-p}$ signal shown in waveform $B_1$ and multiplies or shades this signal by a gain coefficient of −.981 to produce a $-1.38V_{p-p}$ signal. As is well known in the art, the polarity of a sinusoidal signal can be readily changed by simply phase shifting the signal 180°. Consequently, the output $A_2'$ of multiplier 46 can be viewed as either $-1.38V_{p-p}$ at 90°, or $1.3V_{p-p}$ at 270° as shown in waveform $C_1$. As earlier noted in pattern function $P(\theta)$, $A_2' = A_2 \cos 3\phi$ and this expression is the mathematical equivalent of the output of multiplier 46 as shown connected to one input of the first summing network 62. As will now be obvious to those skilled in the art, the multiplier 46 output has been obtained by first amplitude shading the input signal from transducer element 12a by means of amplifier 22 and by a second amplitude shading of the transducer element 12a output signal by multiplier 46 which weighted the input signal by a control signal indicative of the trigonometric function $\cos 3\phi$. With an input control signal representative of an angle $\phi = 63.7°$, the generator 32 will provide the following gain coefficient signals as trigonometric functions of the control input: $\sin \phi = .896$, $\sin 3\phi = -.192$, $\cos \phi = .443$, and $\cos 3\phi = -.981$. The second multiplier 48 has its first input connected to receive the amplitude shaded output $B_1$ from amplifier 22 and amplitude shades this input signal by a control signal representative of the trigonometric function $-\sin 3\phi$ which is connected to the second input of the multiplier 48. The resultant signal from multiplier 48 is shown in waveform $D_1$ as $.266V_{p-p}$ at 90°.

The output of multiplier 48 is connected to the first input of the second summing network 64 and provides an output signal $-A_2''$ which is earlier noted in the expanded pattern function $P(\theta)$ as being equal to $A_2 \sin 3\phi$. Similarly, the analog outputs from transducer elements 12b, 12c, 12d are amplitude shaded to produce output signals representative of pattern function terms $A_1'$, $A_1''$, $-A_1''$, and $A_2''$, all of which are required to implement the pattern function for a predetermined $\theta_o$. Output signals from respective multipliers are shown in waveforms $C_1$–$C_4$, and $D_1$–$D_4$. The respective amplitudes and phase relationships for these waveforms are: $C_2 = 1.24V_{p-p}$, 60°; $C_3 = 1.24V_{p-p}$, 30°; $C_4 = 1.38V_{p-p}$, 180°; $D_2 = 2.5V_{p-p}$, 240°; $D_3 = 2.5V_{p-p}$, 30°; and $D_4 = .266V_{p-p}$, 180°. Due to the fact that $\cos 3\phi$ has a phase reversal, waveforms $C_1$, $C_4$ are phase reversed from waveforms $B_1$, $B_4$. Waveforms $D_2$, $D_4$ are phase reversed from waveforms $B_2$, $B_4$ due to the negative polarity influence of the respective control signals. The first summing network 62 adds all of the input signals representative of those mathematical terms expressed within the first bracketed series noted by the expanded pattern function and the second summing network 64 adds all of the signals representative of the mathematical terms expressed in the second bracketed series of the expanded pattern function. The input signals added by network 62 are all representative of a mathematical expression in terms of the cosine function and network 64 receives input signals that are all representative of the sine function. There is an inherent phase difference of 90° between the above-mentioned sine and cosine functions. Accordingly, the outputs from network 62 shown in waveform $E_1$ and network 64 shown in waveform $E_2$ are in phase quadrature. The respective amplitudes and phases are: $E_1 = .45V_{p-p}$, 0° and $E_2 = .926V_{p-p}$, 90°. Therefore, this 90° phase difference must be removed before attempting to sum the output of the networks 62 and 64 to form a single sum steered pattern output. As shown in FIG. 3, the outputs from each of the networks 62, 64, are individually shifted 45° to achieve a total phase shift of 90° which effectively removes the phase difference between the outputs of the summing networks. A single phase shift of 90° inserted into one or the other of the network 62, 64 outputs will achieve the same effect. The outputs of shifters 66, 70 are shown respectively in waveforms $F_1$, $F_2$ wherein: $F_1 = .45V_{p-p}$, 45° and $F_2 = .926V_{p-p}$, 45°. The outputs of the phase shifters 66, 70 are summed in a final or third summing network 68 to produce an in-phase beam pattern output shown in waveform $G$. The amplitude and phase of waveform $G$ is $1.65V_{p-p}$ at 45°. Note that this amplitude is for a beam steered to $\theta_o = 45°$ and that the original assumption was that the wavefront W impinged at an angle $\theta_o = 10°$. Accordingly, the amplitude of the waveform $G$, had the beam been steered to $\theta_o = 10°$, would be significantly greater because the wavefront would then be directed at the peak response area of the beam pattern. Once the amplifiers 22, 24, 26, 28 are biased to provide the desired gain coefficients $A_1$, $A_2$, the directivity of the steered beam pattern away from normal to the array is dependent entirely upon the value of the single control input $\phi$. Accordingly, as the input $\phi$ is varied from one predetermined limit to the other, the beam pattern may be continuously steered across the entire aperture of the transducer array.

Thus it may be seen that there is provided a novel device for producing a continuously steered beam pattern output from a transducer array by means of amplitude shading and a single control input.

Obviously, many modifications and variations of the invention are possible in light of the above teachings. For example, the array need not be placed in a liquid environment, but may also be used in other energy transmission mediums such as air. In addition, the invention may be practiced with electromagnetic waves or any other wave phenomena, as well as acoustic waves. The array, in addition to being used to receive energy, may be utilized to radiate a signal into the medium. It is therefore to be understood that within the scope of the appended claims, the invention may be practiced otherwise than as specifically described.

What is claimed is:

1. A scanning system for directionally steering the beam pattern of an array of receivers, comprising:

first amplifying means adapted to receive output signals from respective ones of the receivers for providing a plurality of weighted amplified output signals relative to each other;

signal generating means adapted to receive a control signal indicative of the steering angle for generating a plurality of output signals each indicative of a discrete sine and cosine function of the steering angle;

second amplifying means connected to receive said signal generating means output signals and said first amplifying means output signals for providing a plurality of weighted output signals each indicative of the product of selected ones of said first amplifying output signals and said signal generating means output signals respectively;

first summing means connected to receive the cosine-weighted second amplifying means output signals for providing an output signal indicative of the sum thereof;

second summing means connected to receive the sine-weighted second amplifying means output signals for providing an output signal indicative of the sum thereof;

phase shifting means connected to receive said first and second summing means output signals for providing first and second output signals indicative of said first input signal phase shifted in one direction and a second output signal indicative of said second input signal phase shifted in an opposite direction; and third summing means connected to receive said phase shifting means first and second output signals for providing an output signal indicative of the element array output signals at the steering angle.

2. A scanning system according to claim 1 wherein said first amplifying means further comprises a plurality of amplifiers having predetermined gain coefficients.

3. A scanning system according to claim 2 wherein said signal generating means is a trigonometric function generator.

4. A scanning system according to claim 3 wherein said trigonometric function generator is a read only memory.

5. A scanning system according to claim 3 wherein said second amplifying means further comprises a plurality of amplifiers which is twice that of the number of transducer elements.

6. A scanning system according to claim 5 wherein said amplifiers of said second amplifying means are arranged in pairs to be commonly connected to receive the selected ones of said first amplifying output signals and individually connected to receive selected ones of the sine and cosine function output signals, respectively, from said signal generating means.

7. A scanning system according to claim 6 wherein said first and second summing means are summing amplifiers.

8. A scanning system according to claim 7 wherein the phase difference between the output signals of said first and second summing networks is 90°.

9. A scanning system according to claim 8 wherein the output signals of said phase shifting means are in phase.

10. A scanning system according to claim 9 wherein the first and second output signals of said phase shifting means are phase shifted +45° and −45°, respectively.

11. A scanning system according to claim 9 wherein said third summing network is a summing amplifier.

* * * * *